United States Patent [19]

Kim

[11] Patent Number: 5,594,310
[45] Date of Patent: Jan. 14, 1997

[54] APPARATUS AND METHOD FOR EXPANDING AND CONTROLLING THE MULTIFUNCTION MECHAPOSITION

[75] Inventor: Kyung-su Kim, Kyunggi-do, Rep. of Korea

[73] Assignee: SamSung Electronics Co., Ltd., Kyungki-do, Rep. of Korea

[21] Appl. No.: 946,074

[22] Filed: Sep. 18, 1992

Related U.S. Application Data

[62] Division of Ser. No. 491,599, Mar. 12, 1990, Pat. No. 5,159,252.

[30] Foreign Application Priority Data

Oct. 28, 1989 [KR] Rep. of Korea .................. 89-14647

[51] Int. Cl.$^6$ .................. G05B 19/06; H04N 5/783
[52] U.S. Cl. .................. 318/578; 318/560; 386/46; 386/81
[58] Field of Search .................. 318/578, 560, 318/685, 696, 11, 467, 6; 360/10.3, 33.1, 27, 69, 71, 72.1, 72.3, 74.1, 73.05, 73.08, 14.3, 13, 73.07, 137

[56] References Cited

U.S. PATENT DOCUMENTS

| | | | |
|---|---|---|---|
| 3,584,201 | 6/1971 | Pons . | |
| 4,539,603 | 9/1985 | Takeuchi et al. | 360/10.1 |
| 4,549,234 | 10/1985 | Sakamoto | 360/10.2 |
| 4,550,349 | 10/1985 | Okuyama et al. | 360/10.2 |
| 4,786,982 | 11/1988 | Wakahara et al. | 360/10.3 |
| 4,859,922 | 8/1989 | Tauchenitz et al. | 318/628 |
| 5,047,878 | 9/1991 | Woo | 360/69 |
| 5,053,890 | 10/1991 | Namiki | 360/19.1 |
| 5,117,316 | 5/1992 | Kim | 360/73.07 |

*Primary Examiner*—Paul Ip
*Attorney, Agent, or Firm*—Robert E. Bushnell, Esq.

[57] ABSTRACT

A multifunction mechaposition expanding controlling apparatus and method thereof are provided which can expand and control the mechaposition according to the number of the function as many as the desired numbers by rotating, above 360°, having the program switch of a rotary type of the multifunction electronic machineries having a deck. The apparatus comprises a microcomputer, a capstan motor and a loading motor, a program switch of a rotary type, a deck and a motor driving portion.

21 Claims, 4 Drawing Sheets

APPARATUS AND METHOD FOR EXPANDING AND CONTROLLING THE MULTIFUNCTION MECHAPOSITION

This is a Divisional of application Ser. No. 07/491,599, filed 12 Mar. 1990, now Pat. No. 5,159,252.

FIELD OF THE INVENTION

The present invention relates to a multifunction control in electronic machinery having a deck, and particularly to apparatus and method thereof which can perform control by expanding states of a tape-handling mechanism (i.e. mecha position or mechanical position) for the multiple functions

BACKGROUND OF THE INVENTION

In general, there is a video tape recorder, a digital audio tape recorder, a camcorder and a robot, etc, all of which are electronic machinery having a deck, and these examples of electronic machinery control a mechanism by the input of a sensor.

Recently, besides an original function, the accompanying manifold functions for the convenience of users are being appended to electric machinery having a deck and, in order to detect a state of a tape-handling mechanism corresponding to these accompanying manifold functions, a program switch tends to be used instead of many sensors.

Such a program switch is classified into a slide type and a rotary type.

Of these types, since the program switch of a rotary type operated by the electric power of a loading motor can detect the more accurate states of the tap-handling mechanism (i.e. the "mechaposition") than the program switch of a slide type, the program switch of a slide type is being replaced by the program switch of a rotary type.

However, since the prior program switch of a rotary type can rotate only within 360° due to the double detection of the same mechaposition, the kinds of mechpositions can not be diversified so that the mecha condition suitable for the multiple function modes can not be established.

SUMMARY OF THE INVENTION

It is an object of the present invention to provide a controlling apparatus for extending the multifunction mechaposition and a method thereof which can control the functions of their mechanism by extending the multifunction mechaposition of electronic machinery having a deck.

To accomplish these and other objects, an apparatus of the present invention may be characterized by comprising;

a microcomputer for controlling a system;

a loading motor and a capstan motor for making the recorded interval of a recording medium run;

a program switch of a rotary type having multiple detecting contact plates for supplying multiple logic signals, in which have different logic values according to each position to the microcomputer by being operated by the loading motor;

a deck having a starting and ending sensor for supplying to the microcomputer by detecting the ending and starting point of a tape; and a motor driving portion for driving a variety of motors within the deck under the control of the microcomputer.

Also, in order to achieve these and other objects, a method of the present invention may be characterized by as:

a position check process in which a microcomputer checks where a mechaposition is located among a still position, a pinch roller-in (hereinafter "P-IN") position, a regeneration position, a picture still position, an operation stop position, a reverse picture search (hereinafter "REV") position, an unloading position, a short forward/rewind (hereinafter "short F/R") position, an eject position and a fast forward/rewind (hereinafter "FF/REW") position in the state of the capstan motor and loading motor which are rotating forward;

a first position convert process in which a microcomputer converts the present position into an unloading position when a mechaposition is at a still position, a P-IN position or a regeneration position, a picture still position or an operation stop position, or a REV position during the position check process;

an initializing confirm process in which a microcomputer stop a loading motor and a capstan motor by controlling a motor driving portion when a mechaposition is at an unloading position during the position check process;

a second position convert process in which a microcomputer converts the present position into an eject position when a mechaposition is at a short F/R position during the position check process;

a first imaginary of false position search process in which a microcomputer checks whether the present detected eject position is false and, if it is false, the first position convert process is performed when a mechaposition is at a withdrawl position during the position check process; and a second imaginary of false position search process in which a microcomputer checks whether the present detected FF/REW position is imaginary and, if it is imaginary, the first position convert process is performed and, if it is genuine the second position convert process is performed when a mechaposition is at a FF/REW position during the position check process.

The above objects and other advantages of the present invention will become more apparent by describing the preferred embodiment of the present invention with reference to the attached drawings.

DETAILED DESCRIPTION OF THE PREFERRED EMBODIMENT OF THE INVENTION

Figure 1:
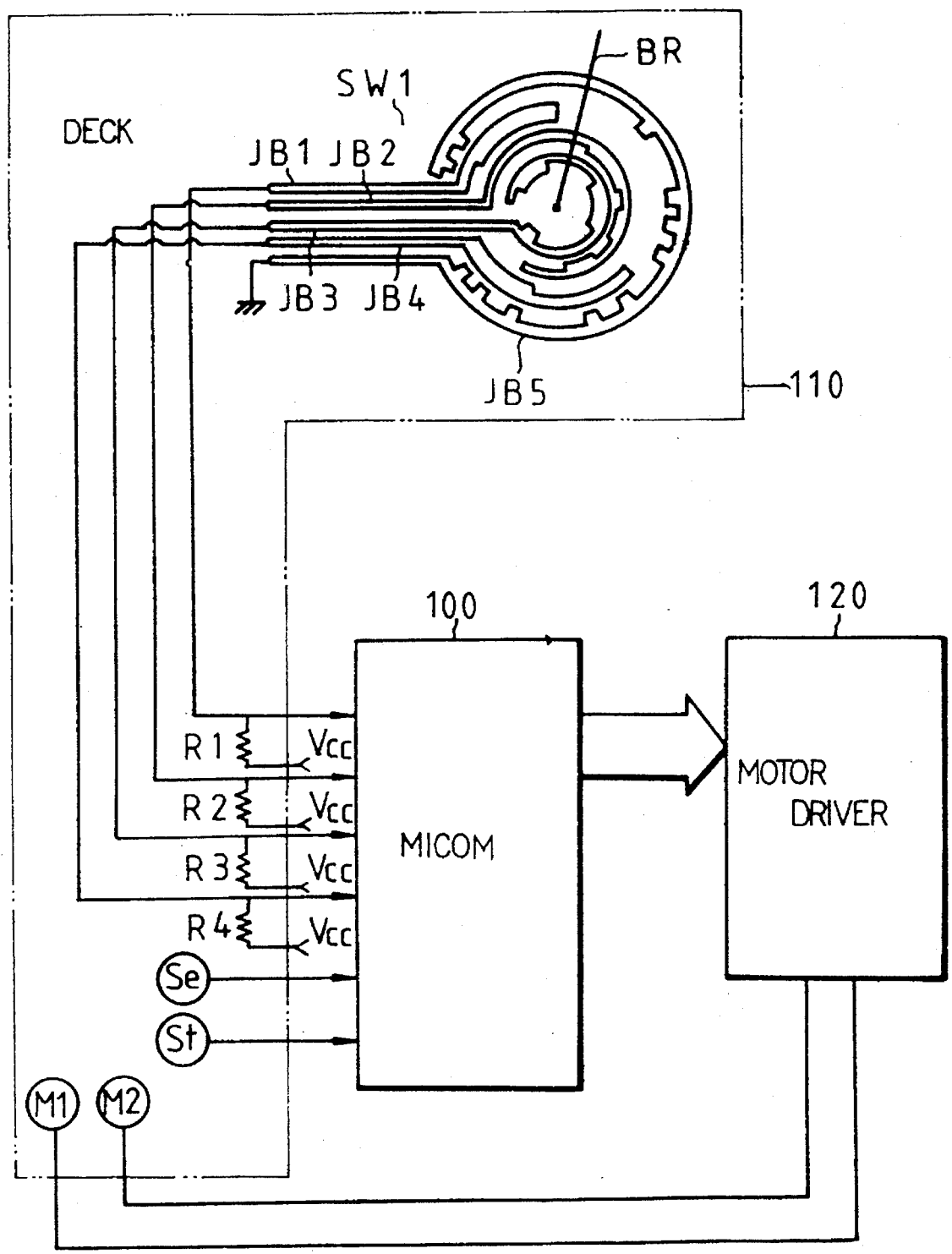
FIG. 1 is a system-diagram of one embodiment of the present invention.

FIG. 1 is a system diagram of the present invention. The embodiment shown in FIG. 1 has a microcomputer 100 for controlling a system, a loading motor M2 and a capstan motor 1 M1 for the traveling of a system, a program switch of a rotary type SW1 having the multiple detecting contact plates for supplying the multiple logic signals which have different logic values according to each position to microcomputer 100 by being operated by the loading motor M2, a deck 110 having a starting and ending sensor St, Se for supplying microcomputer 100 by detecting the ending and starting point of a tape, and a motor driving portion 120 for driving a variety of motors within deck 110 under the control of the microcomputer 100.

In FIG. 1, microcomputer 100 senses mechaposition by the sensing signals which are inputted from deck 110, and next, controls the mechaposition of a deck corresponding to the function by operating motors within, deck 110.

Then, microcomputer 100 senses the mechaposition which running by the program switch of a rotary type SW1 and the starting and ending sensors St, Se within deck 110 and the running state of a tape and deck 110, makes a mechaposition maintained in a variety of motors which are operated by the driving signal of a motor driving portion 120.

A program switch of a rotary type SW1 included within deck 110 comprises a brush BR which is rotated by a loading motor, four position detecting contact plates JB1 JB4 and a common ground connecting contact plate JB5, and the four position detecting contact plates JB1 to JB4 have multiple salient, contact points respectively, in order to be able to detect a mechaposition having different logic values of maximum 16 according to the rotating of a brush above 360°, and a common ground connecting contact plate JB5 has salient contact points as many as the numbers of mechapositions which can be detected.

Figure 3:
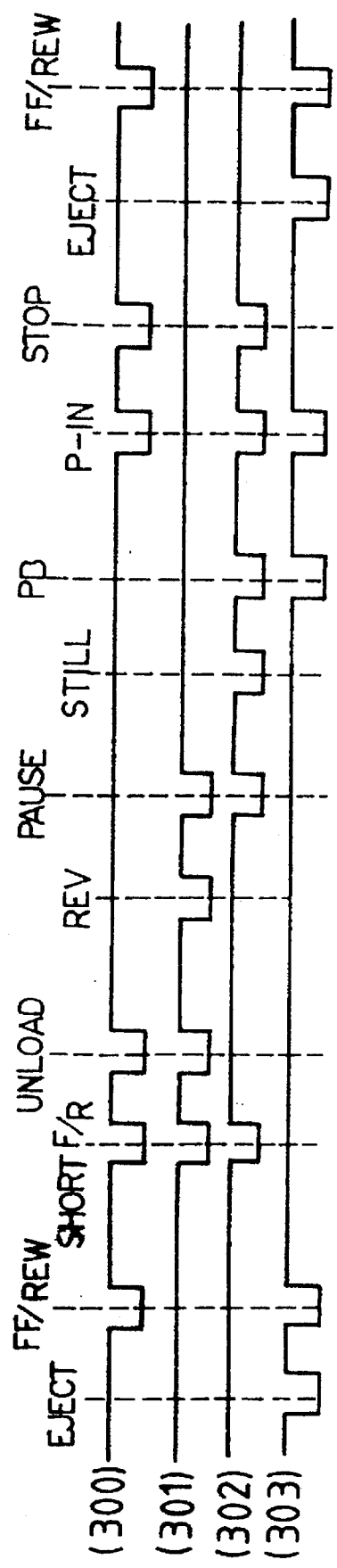
FIG. 3 is an output waveform corresponding to each contact of a program switch according to the present invention.

The four position detecting contact plates JB1 to JB4 supply such logic signals as 300 to 303 in FIG. 3, to microcomputer 100 as they are opened or conducted to the common ground connecting contact plate JB5 according to the rotating of their respective brush, and among the plates, the detecting contact plate JB1 supplies such a logic signal as 300 in FIG. 3, the detecting contact plate JB3 such a logic signal as 301 in FIG. 3, the detecting contact plate JB4 such a logic signal as 303 in FIG. 3, within microcomputer 100.

Then, the starting and ending sensors St,Se which are set up in deck 110 supply a sensing signal to microcomputer 100 by sensing whether a tape is at the starting point or at the ending point.

A motor driving portion 120 connected between microcomputer 100 and deck 110 drives a variety of motors within the deck by the controlling signal which is inputted from microcomputer 100.

Additionally, deck 110 has a variety of motors, for example, a capstan motor M1 and a loading motor, etc., within itself, and has many apparatuses and others, but, having no relation to the present invention, many of the apparatuses within deck 110 are not shown in the drawings.

Figure 2A:
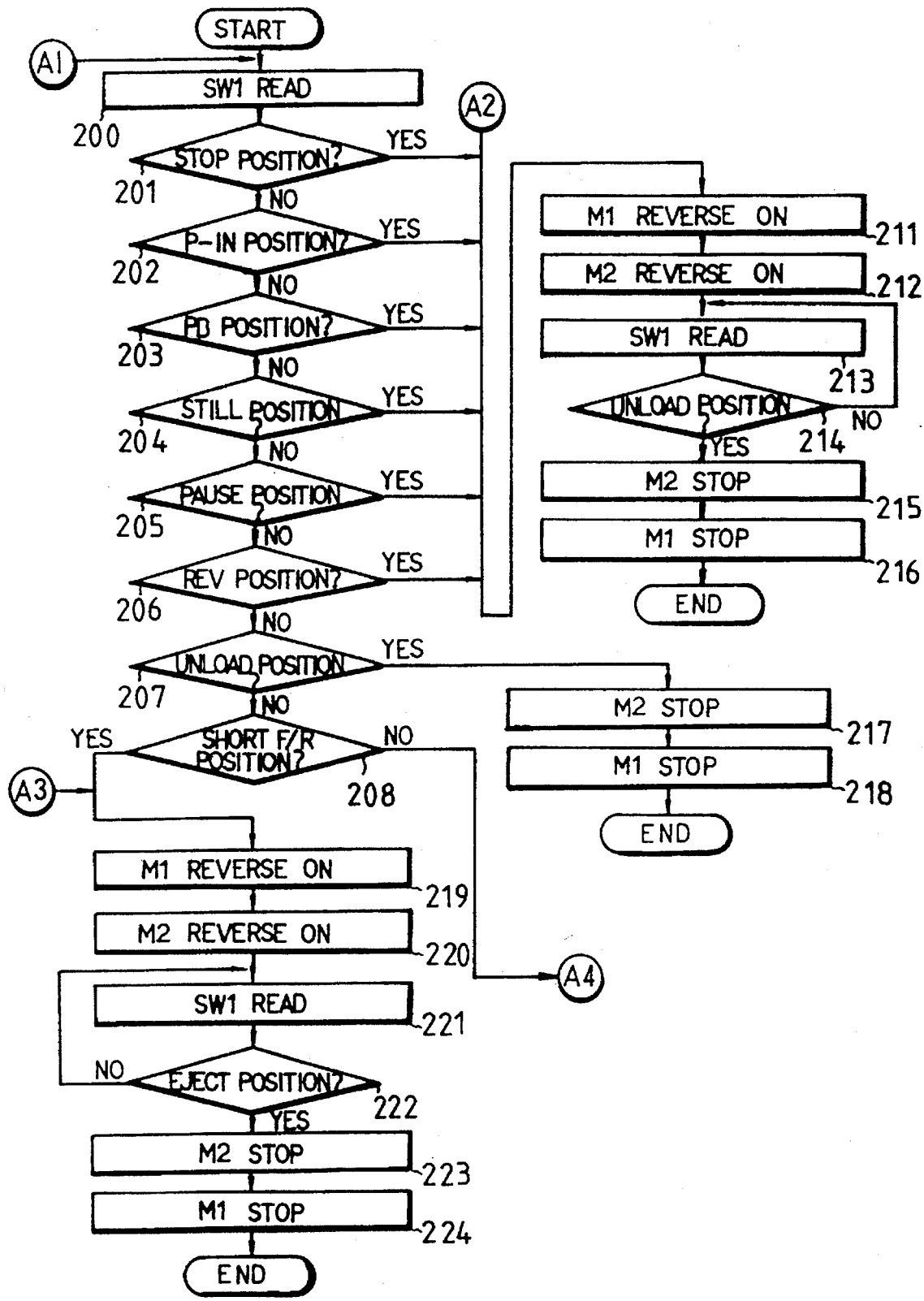
FIGS. 2A and 2B are flow chart for the embodiment of the present invention.
Figure 2B:
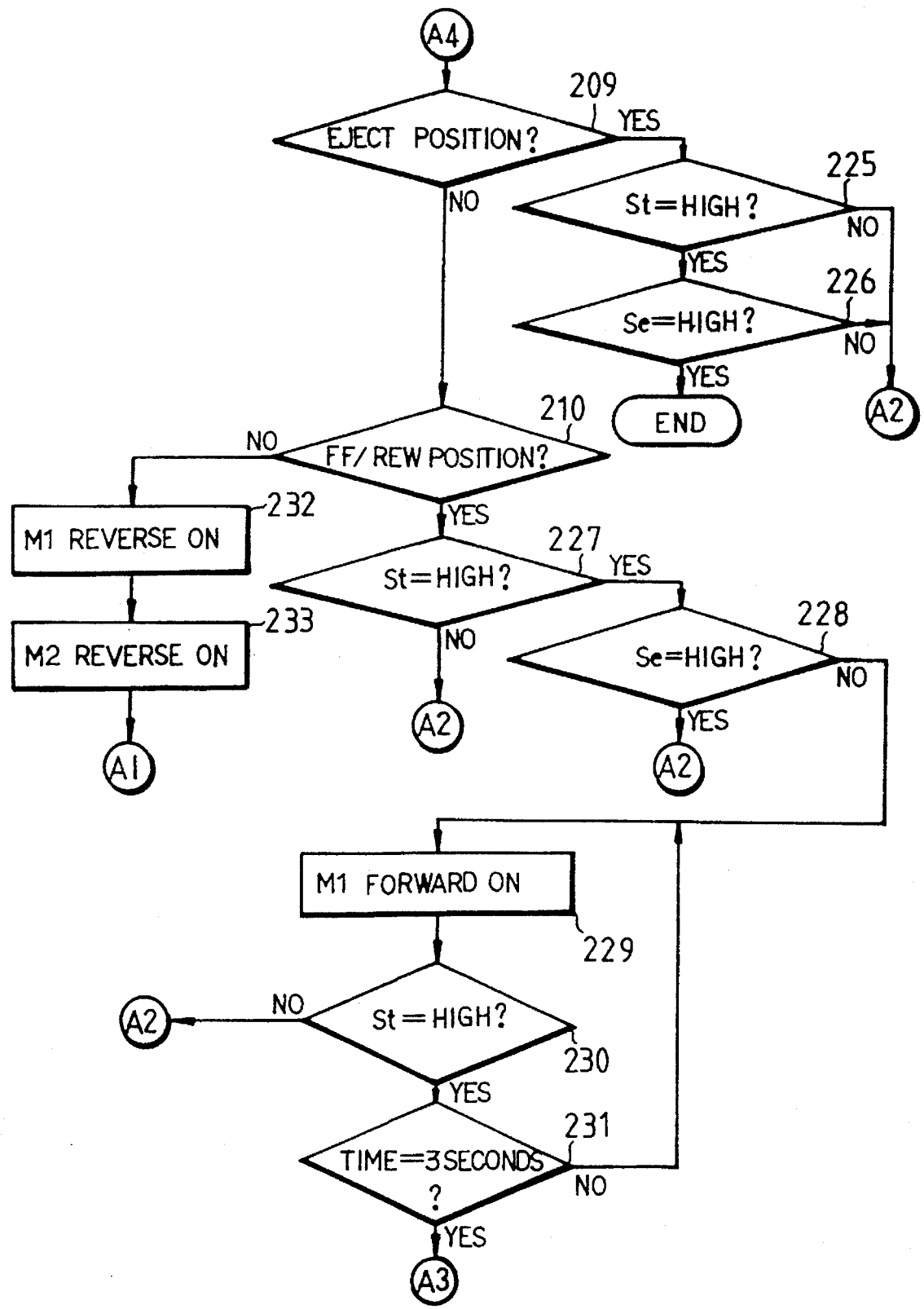

FIGS. 2A and 2B are flow charts which are performed by microcomputer 100 of the circuit diagram shown in FIG. 1 according to the present invention.

FIGS. 2A and 2B comprise a position check process in which a microcomputer 100 checks where a mechaposition is located according to the output of the program switch of a rotary type among a still position, a P-IN position, regeneration position, a picture still position, an operation stop position, a REV position, an unloading position, a short F/R position, an eject position and a FF/REW position when a power source is 'ON';

a first position convert process in which microcomputer 100 converts the present position into an unloading position when a mechaposition is at a still position, a P-IN position or a regeneration position, a picture still position or an operation stop position, or a REV position during the position check process;

an initializing confirm process in which microcomputer 100 stops a loading motor M2 and a capstan motor M1 by controlling a motor driving portion when a mechaposition is at an unloading position during the position check process;

a second position convert process in which microcomputer 100 converts the present position into an eject position when a mechaposition is at a short F/R position during the position check process;

a first imaginary position search process in which microcomputer 100 checks whether the present detected eject position is false and, if it is false, the first position convert process is performed when a mechaposition is at an eject position during the position check process; and a second imaginary position search process in which a microcomputer checks whether the present detected FF/REW position is imaginary and, if it is imaginary, the first position convert process is performed and, if it is genuine, the second position convert process is performed when a mechaposition is at a FF/REW position during the position check process.

In FIG. 2, when an initial power source is "ON", in the state of a capstan motor M1 and a loading motor M2 rotating forwardly, microcomputer 100 reads the logic signals on the contact plates JB1 to JB4 of the program switch of a rotary type within deck 110 in step, 200 and next, where a mechaposition is positioned among a still position, a P-IN position, a regeneration position, a picture still position, an operation stop position, a REV position, an unloading position, a short F/R position, an eject position and a FF/REW position is checked by the logic value which is determined by the read logic signals in steps 201 to 210.

Among steps 201 to 210, when in a still position, a P-IN position or a regeneration position, a picture still position or an operation stop position or a REW position, after microcomputer 100 controls motor driving portion 120 and rotates the capstan motor M1 and the loading motor M2 within deck 110 reversely in steps 211,212 and next, reads the logic signals on the contact plates JB1 to JB4 for the detection of the program switch SW1 of a rotary type within deck 110, in step 213, whether the read logic signals are in an unloading position or not is checked by the designated logic value and, if the read logic signals are not in an unloading position, the microcomputer is returned to steps 213, 214.

In step 214, if the read logic signals are in an unloading position, microcomputer 100 controls motor driving portion 120 and stops the loading motor M2 and the capstan motor M1 which are built within deck 110, in turn, by controlling motor driving portion 120, in steps 215, 216, Consequently, steps 211 to 216 are the processes for unloading a tape.

In the steps 201 to 210, if the read logic signals are in an unloading position, microcomputer 100 controls motor driving portion 120 and stops the loading motor M2 and the capstan motor M1 which are built within deck 110, in order, in steps 217, 218.

In steps 201 to 210, when in a short F/R position, microcomputer 100 controls motor driving portion 120 and rotates reversely the capstan motor M1 and the loading motor M2 which are built within deck 110 and are rotating forward, in order, in steps 219, 220.

After performing step 220, microcomputer 100 reads the logic signals on the detecting contact plates of the program switch of rotary type SW1 within deck 100, and stands by until the read logic signals are in an eject position by checking the designated logic value, in step 222.

In the step 222, when the read logic signals are in an eject position, microcomputer 100 controls motor driving portion 120 and stops the loading motor M2 and the capstan motor M1 which are built within deck 110 and are rotating reversely, in order, in steps 223, 224.

Consequently, steps 219 to 224 are the processes which convert the present mechaposition into an eject position.

In steps 201 to 210, when in an eject position, microcomputer 100 checks whether the starting sensing signal of a high logic state is inputted from the starting sensor St which is built within deck 110, and judges whether tape is at the starting point, in step 225.

In 225 step, when the tape is at the starting point, microcomputer 100 checks whether the ending sensing signal of a high logic state is inputted from the ending sensor Se which is built within deck 110, in step 226.

In step 226, when an ending sensing signal of a high logic state is inputted, microcomputer 100 ends an initializing operation and, on the other hand, in step 225, when a starting sensing signal of a high logic state is not inputted and, in step 226, when an ending sensing signal of a high logic state is not inputted, microcomputer 100 is returned to step 211.

Namely, steps 225, 226 are the processes checking whether an eject position is a genuine position or an imaginary position, and, if it is a genuine eject position, microcomputer 100 finishes an initializing operation and, if it is an imaginary eject position, microcomputer 100 is returned to the unloading process.

In steps 201-210, when in a FF/REW position, microcomputer 100 checks whether the starting sensing signal of a high logic state is inputted from the starting sensor St which is built within deck 110, in step 227.

In step 227, when the sensing signal of a high logic state is inputted, microcomputer 100 checks whether the ending sensing signal of a high logic state is inputted from the ending sensor Se which is built within deck 110, in step 228.

In step 228, when the ending sensing signal of a high logic state is not inputted, microcomputer 100, controls a motor driving portion 120 during the fixed time, for example, 3 seconds and rotating forward the capstan motor M1 which is built within deck 110, checks whether the starting sensing signal of a high logic state is inputted from the starting sensor Se within deck 110, in steps 229 to 231.

In steps 229 to 321, when the starting sensing signal is inputted, microcomputer 100 performs step 219.

In steps 229 to 231, when the starting sensing signal of a high logic state is not inputted at step 227 or the ending sensing signal of a high logic state is inputted at step 228, microcomputer 100 performs step 211.

Consequently, steps 227 to 231 judge whether a FF/REW position is a genuine position or an imaginary position and, if it is a genuine FF/REW position, microcomputer 100 goes to the process which converts to the eject position and, if it is an imaginary FF/REW position, microcomputer 100 goes to the process which converts to the unloading position.

When a mechaposition is not set at steps 201 to 210, microcomputer 100 controls motor driving portion 120 and rotates reversely the capstan motor M1 and the loading motor M2 within the deck, in order, and next, is returned to step 200.

Steps 225 to 231 are the processes for distinguishing the imaginary eject position and the imaginary FF/REW position from the genuine eject position and the genuine FF/REW position which are detected doubly due to the rotating of the brush BR on the program switch of a rotary type above 360°.

As described above, the present invention can expand and control the mechaposition according to the number of the functions as many as the desired numbers by rotating, above 360°, the program switch of a rotary type of the multifunction electronic machineries having a deck.

What is claimed is:

1. An apparatus, in multifunction electronic machineries using a recording medium, comprising:

a microcomputer for controlling a system;

a capstan motor and a loading motor for making the recorded interval of a recording medium travel;

a program switch of a rotary type having multiple detecting contact plates for supplying, to said microcomputer, multiple logic signals having first and second positions for providing first and second logic values, respectively, penultimate and last positions for providing false first logic values and false second logic values, respectively, and a plurality of different logic values varying according to each position of said program switch between said second and penultimate positions, said penultimate and last positions being selectable after said program switch has been rotated past 360 degrees;

a deck including a starting and an ending sensor for detecting the ending and the starting points of a tape; and a motor driving portion for driving a variety of motors within said deck under the control of said microcomputer with said microcomputer controlling said capstan motor and said loading motor through said motor driving portion according to the output logic values of said program switch of a rotary type and controlling a function of said motor driving portion according to the position of said program switch and in response output signals from said starting and ending sensors.

2. An apparatus as claimed in claim 1, further comprised of said detecting contact plates of said program switch of a rotary type comprising multiple salient contact points with said detecting contact plates of said program switch of a rotary type having different logic values according to each position as rotation of said program switch alters electrical conduction through said contact plates.

3. An apparatus as claimed in claim 1, in which said program switch of a rotary type comprises:

multiple detecting contact plates; and a brush for contacting said multiple detecting contact plates, said brush experiencing an angle of rotation greater than 360 degrees to provide all of said logic values.

4. A method for discriminating a position state of a recording medium-handling mechanism having a microcomputer, a program switch and sensing means for sensing a moving state of a recording medium on a recording medium magazine, said method comprising the step of:

reading a value in said program switch and determining which position state is represented by said read value;

if said position state is one position state among a first state, moving said recording medium-handling mechanism to a predetermined mechanism position; and if said position state is one position state among a second state, detecting outputs of said sensing means to recognize a first position state or a second position state.

5. The method according to claim 4, further comprising the step of moving said recording medium-handling mechanism to a predetermined mechanism position according to a position state of said second state if said second position state has been recognized.

6. The method according to claim 4, wherein further comprising the step of rotating said program switch is permitted to rotate more than 360°.

7. The method according to claim 4, wherein said second state comprises two position states having an identical position state value.

8. The method according to claim 4, wherein said method is used for locating an initial position of a video cassette recorder upon turning on said video cassette recorder.

9. A method for discriminating a position state of a recording medium-handling mechanism having a microcomputer, a program switch and means for sensing a moving state of a recording medium, said method comprising the steps of:

reading a value in said program switch and determining which position state is represented by said read mode value;

if said position state is one position state among a first state, moving said recording medium-handling mechanism to a predetermined mechanism position; and if said position state is one position state among a second state, detecting an output of said sensing means to recognize which position state is represented by said one position state among said second state using said output detected in said sensing means.

10. An improved method for operating a video recorder including a microcomputer, a switch generating a plurality of position indications during rotation of said switch between a zero angular position and a second angular position in excess of 360 degrees, wherein at least a first position indication and a second position indication generated by said switch are identical to one another and wherein only one of said first position indication and said second position indication defines a true position indication with respect to an actual angular position, and a sensor generating a signal corresponding to a physical parameter of a recording medium, said microcomputer generating a respective control signal in response to said true position indication, said improved method comprising the steps of:

(a) receiving one of said position indications;

(b) when one of said position indications corresponding to both said first position indication and said second position indication is received during step (a), identifying said true position indication based on said signal; and (c) generating said respective control signal.

11. The improved method for operating a video recorder as recited in claim 10, wherein said physical parameter of said recording medium is a position of said recording medium.

12. The improved method for operating a video recorder as recited in claim 10, wherein said sensor comprises a first sensor and a second sensor, wherein said signal comprises a first signal generated by first sensor and a second signal generated by said second sensor, and wherein said step (b) comprises the step of:

(d) when said one of said position indications corresponding to both said first position indication and said second position indication is received during step (a), identifying said true position indication based on said first signal and said second signal.

13. An improved method for operating a video recorder including a microcomputer, operatively connected to a rotary switch and a sensor, for generating a plurality of control signals, wherein said rotary switch generates a plurality of data signals including a plurality of first data signals respectively corresponding to one of said control signals and at least one data signal corresponding to both a first rotation data signal and a second rotation data signal as said rotary switch is rotated between an initial angular position and a final angular position in excess of 360 degrees, and wherein said sensor generates a logical signal indicative of a physical parameter of a recording medium, said improved method comprising the steps of:

(a) receiving one of said data signals;

(b) when said one of said data signals is one of said first data signals, generating said respective control signal;

(c) when said one of said data signals corresponds to both said first rotation data signal and said second rotation data signal, receiving said logical signal;

(d) determining a logically true combination of said logical signal with said first rotation data signal and said second rotation data signal;

(e) generating said respective control signal corresponding to said logically true combination.

14. The improved method for operating a video recorder as recited in claim 13, wherein said physical parameter of said recording medium is a position of said recording medium.

15. The improved method for operating a video recorder as recited in claim 13, wherein said sensor comprises a first sensor and a second sensor, wherein said logical signal comprises a first logical signal generated by said first sensor and a second logical signal generated by said second sensor, and wherein said step (d) comprises the step of:

(d) determining a logically true combination of said first logical signal, said second logical signal, said first rotation data signal and said second rotation data signal.

16. An improved video recorder including a microcomputer for generating a number N of control signals, where N is an integer, controlling a plurality of predetermined operations to thereby control motion and position of a recording medium, said improvement comprising:

a rotary switch for generating a plurality of data signals as said rotary switch is rotated between an initial angular position and a final angular position in excess of 360 degrees; and a sensor for generating a logical signal indicative of a physical parameter of a recording medium;

wherein said rotary switch produces an ambiguous data signal provided to said microcomputer at both a first angular position being substantially equal to said first angular position plus 360, and wherein said microcomputer resolves said ambiguous control signal into a true control signal and a false control signal and generates a respective one of said N control signals corresponding to said true control signal in response to said logical signal.

17. The improved video recorder as recited in claim 16, wherein said physical parameter of said recording medium is position of said recording medium.

18. An apparatus for use in multifunction electronic machineries using a recording medium, having a tape handling mechanism capable of being in different position states, comprising:

a deck having a capstan motor, loading motor, starting sensor for producing starting signals at a starting point of said recording medium and an ending sensor for producing ending signals at an ending point of said recording medium;

a program switch of a rotary type mounted within said deck, for supplying various signals according to said position state of said tape handling mechanism, having a plurality of detecting contact plates disposed in a circular manner and a contact means, in which said contact means rotates about said multiple detecting contact plates and has a rotating angle in excess of 360 degrees;

a driving means for driving said capstan motor and said loading motor; and a microcomputing means for receiving said various signals supplied by said program switch, said starting signals produced by said starting sensor and said ending signals produced by said ending sensor, and controlling said driving means.

19. An apparatus for use in multifunction electronic machineries using a recording medium as recited in claim 18, wherein said loading motor rotates said contact means about said multiple detecting contact plates.

20. An apparatus for use in multifunction electronic machineries using a recording medium as recited in claim 18, wherein said contact means comprises a brush.

21. The apparatus as claimed in claim 18, wherein said detecting contact plates of said rotary type program switch comprise multiple salient contact points so that said detecting contact plates supply different logic values according to each position in as said brush rotates.

* * * * *